March 8, 1932.  H. FÖTTINGER  1,848,615

POWER TRANSMITTING SYSTEM

Filed March 18, 1929   2 Sheets-Sheet 1

Inventor
Hermann Föttinger
by Dean Fairbank Obright & Hirsch
his Attorneys

March 8, 1932.　　H. FÖTTINGER　　1,848,615
POWER TRANSMITTING SYSTEM
Filed March 18, 1929　　2 Sheets-Sheet 2

Inventor
Hermann Föttinger
by
Dean Fairbank Obreght & Hurd
his Attorneys

Patented Mar. 8, 1932

1,848,615

UNITED STATES PATENT OFFICE

HERMANN FÖTTINGER, OF BERLIN-WILMERSDORF, GERMANY

POWER TRANSMITTING SYSTEM

Application filed March 18, 1929, Serial No 347,768, and in Germany March 26, 1928.

The invention relates to a mechanism for transmitting power for various purposes, such as the operation of clutches, brakes, gears and similar devices, the power being transmitted from a rotary shaft.

An object of the invention is to obtain a controllable operation of actuating members from outside which operation may be selectively varied, whereby actuating forces and movements of any desired amount are automatically transmitted from a rotary driving shaft.

This is attained by filling the chambers of the rotary driving part from the outside with a readily movable mass of high specific weight consisting of small round parts, such as, for instance, steel balls. By the action of centrifugal force pressures are generated by the balls which act on the movable parts of the surrounding walls of the ball receiving chambers, such as the faces of diaphragms or pistons. The forces and movements so generated can be utilized for various purposes.

In the accompanying drawings, which form a part of this specification, several embodiments of the invention are illustrated diagrammatically by way of example.

Fig. 1 is an end elevation of one form of mechanism embodying the present invention.

Fig. 2 in its upper part is an axial vertical section and in its lower part a side elevation of the mechanism shown in Fig. 1.

Like or similar reference numerals denote like or similar parts throughout all figures of the drawings.

Figure 1:
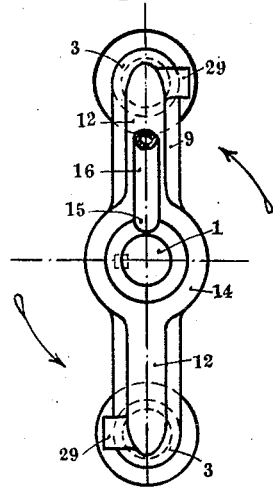
Figure 2:
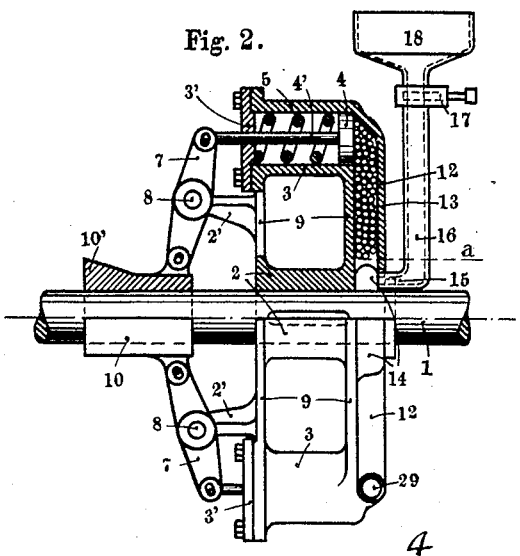

Referring to Figs. 1 and 2 there is provided a rotary shaft 1, and a boss 2 keyed thereto, said boss having radial arms 9 extending therefrom. Cylinders 3 closed by head plates 3' are provided at the free ends of these arms 9, these cylinders having mounted therein pistons 4, movable in a direction parallel to the axis of the shaft 1. Connected to each of said pistons 4, is a piston rod 4' and mounted in each of the cylinders 3 is a spring 5 disposed between the head plate 3' and the piston 4. The device is provided with passages 12 extending radially inwards from the cylinders 3 towards the shaft, and an annular chamber 14 connected with the inner ends of the passages 12 and open at its outer or right hand side (Fig. 2). Projecting from the arms 9 are brackets 2', which bear pivots 8 upon which double-armed levers 7 are rockably mounted. The arms of the levers are pivotally connected, respectively, to the piston rods 4' and to a sleeve 10 adapted to be axially displaced along the shaft 1. A stationary hopper 18, located above the shaft 1, is connected with the annular chamber 14 by means, comprising a valve 17 and a vertical pipe 16 the nozzle 15 of which opens into the annular opening of the chamber 14, but has no rigid connection with rotating parts. The hopper 18 is normally filled with small round heavy objects, preferably steel balls which may be dropped in the pipe 16 in selective quantities, by opening the valve 17, and delivered to the annular chamber 14 from which point they are distributed into the passages 12, which are filled up thereby in accordance with the effect desired to be attained.

When the shaft 1 is rapidly rotated in the direction indicated by the arrows in Fig. 1, and the passages 12 are charged with balls to a predetermined extent, the movable or plastic mass 13 formed by the balls will behave under the action of centrifugal force in some respects like a column of liquid and act on the pistons 4 with a predetermined pressure head. Thus the pistons are moved to the left in the cylinders 3 as viewed in Fig. 2 thereby compressing the springs 5, rotating the levers 7 in a counterclockwise direction and causing the sleeve 10 to move to the right. The sleeve bears a cam surface 10' which may be adapted to control or regulate any actuating member desired to be operated. It should be noted that the displacement of the sleeve may also be utilized for any other purpose directly or indirectly, as is well known in the art. The power exerted by the mass 13 on the pistons may be varied by varying the level $a$ to which the passages 12 are filled.

Figure 4:
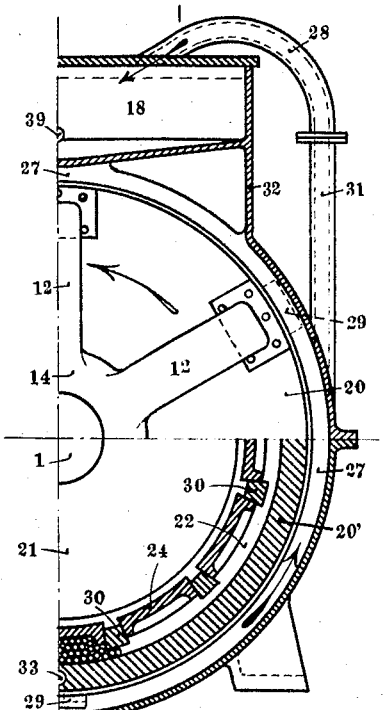
Fig. 4 is a section taken on line 4—4 of Fig. 3.
Figure 3:
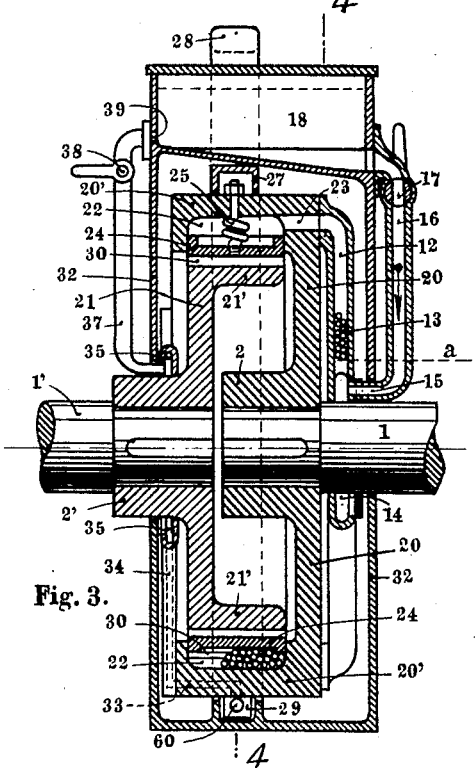
Fig. 3 is an axial vertical sectional elevation of another modified form of mechanism embodying the present invention and particularly adapted as a clutch arrangement.

In the modified device represented in Figs. 3 and 4 the force generated in the mass 13 and applied to movable parts of the rotating element is utilized for the operation of a clutch. This modified form includes the driving shaft 1, the driven shaft 1', the boss 2 of a driving member 20 constituting part of a clutch which is keyed to the primary shaft 1. There is provided within the cylinder wall 20' of the member 20 an annular chamber 22 bounded by an inner wall 30 in which there are a plurality of openings. Said openings may be circular, square or of any other form. Flat pistons 24 of corresponding cross-section are adapted to radially move in the openings. Springs 25 connected to the pistons 24 and secured in the cylindric wall 20' tend to pull the pistons 24 in their openings radially outwards, while the pistons are further influenced by centrifugal force when the driving part 20 is rotated. Facing the pistons 24 is a cylindrical rim 21' carried by the part 2' of the driven or secondary shaft 1' and co-axially located within the member 20.

The means for supplying the movable mass 13 from the hopper 18 to the chamber 22 is similar to that shown in Figs. 1 and 2. It comprises a valve 17, a supply pipe 16, having a delivery nozzle 15 at its lower end near the shaft 1, said nozzle entering the annular distributing channel 14 from which the radial passages 12 lead to the periphery of the member 20. The conduits 14 and 12 are fixed to the member 20. Perforations 23 are provided in the wall of the member 20 connecting the outer ends of the passages 12 with the chamber 22. The operative elements of the device are surrounded by a casing 32 which also serves to support the supply hopper 18.

When the balls 13 have been charged from the hopper 18 into the work chamber 22, and while the passages 12 are filled up to sufficient head $a$, the pressure on the pistons 24 will be increased so as to overcome the pull of the springs 25 and the centrifugal action and force the pistons 24 onto the rim 21' of the member 21, whereupon said pistons act as friction blocks. The blocks will slip at first, and then produce a friction connection of the parts 2 and 2'. This coupling remains in engaged position during rotation of the shaft 1, as the mass 13 automatically maintains the required pressure.

In Figs. 3, 4, 5, 6 and 7 the several passages and chambers are shown, for the sake of clearness, without or partially, filled with balls.

For uncoupling the shafts the space 22 and the passages 12 must be emptied into an outer chamber by discharging the balls through suitable openings near the perimeter of the member 20 during its rotation. The openings may be controlled by any suitable slide valves or the like. Preferably, however, the principle of the invention is applied to the controlling of the ball discharge. Generally the discharge openings are closed by valves 29 or the like. When the valves are opened the ball charge contained in the passages 12 and chamber 22 is thrown out under the action of centrifugal force. The springs 25, assisted by centrifugal force, now pull the pistons or blocks 24 outwards, thus breaking the connection of parts 2 and 2'.

Figure 6:
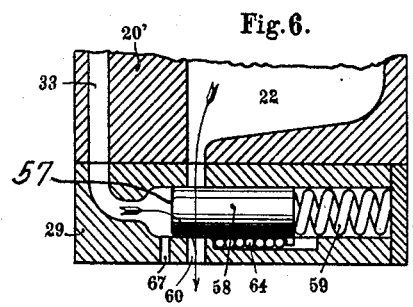
Fig. 6 is a section, on a larger scale, showing a detail of the mechanism, represented in Figs. 3 and 4, for controlling the discharge of the movable mass of balls.

The slide 58 of the valve 29 illustrated in Fig. 6 with all details may be moved as required by the plastic mass 13. Balls are supplied through an outlet 39 of the hopper 18, a valve 38 and pipe 37 to an annular passage 35. A pipe 34 is provided and channels 33 in the rim 20' said channels connecting the passage 35 with the valve 29. The conduits 33, 34 and 35 rotate with the member 20. A discharge passage 60 is provided connected with the space 22 the outlet of which is controlled by the slide 58. A spring 59 normally pushes the slide transversely of the opening 60 to close it. The passage 60 is opened by admitting balls through the conduits 38, 37, 35, 34 and 33 to a chamber in front of the face 57 of the slide 58. The pressure of the ball charge moves the slide 58 backwards, until the opening 60 is laid bare and the balls can be ejected from the work chamber 22 by centrifugal force. Part of the balls fed through the channel 33 will at the same time be discharged through the opening 60, as indicated by the arrows in Fig. 6. In order to keep open the passage 60 balls must therefore be continuously added or filled up in the channel 33. When all balls have been discharged from the chamber 22 the supply of balls to the channel 33 is interrupted by closing the valve 38 whereupon the spring 59 closes the valve by pushing the piston 58 forwards, while the balls still contained in the channel 33 are gradually discharged by a small permanently open auxiliary passage 67. This passage is not able to effect a reduction of the pressure as long as the charging depth in the pipe 34 is maintained, but after the make-up of balls has ceased, permits the conduits 35, 34 and 33 to be completely emptied.

Figure 7:
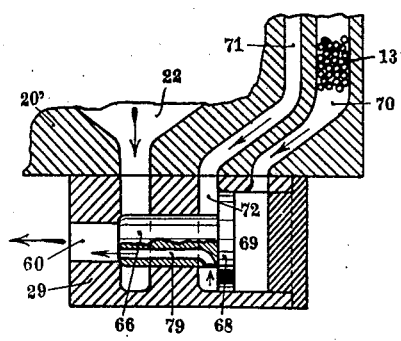
Fig. 7 is a sectional elevation of a modification of the movable mass discharge control.

In Fig. 7 the spring 59 is substituted by a pressure chamber 69 which is fed from a passage 70 filled with balls only to limited depth. The balls act on the rear face of a differential piston 68 which is connected with a slide 66 controlling the passage 60. A chamber 72 at the opposite side of the differential piston 68 can be charged with balls through a passage 71 as hereinbefore disclosed, the depth of the radial column 13 of balls being so selected that the pressure of the balls in the chamber 69 on the back of the piston 68 is overcome, and the slide 66 withdrawn from the passage 60. A longitudinal passage 79 in the slide 66 is provided, said passage forming an open connection between the chamber 72 and the passage 60 similarly to the opening 67. The balls in the passage 71 must be made up permanently as long as the slide 66 is to be withdrawn. After the evacuation of the chamber 22 and the interruption of the supply to the channel 71 the balls in the chamber 72 are completely ejected through the passage 79. Then the pressure of the mass of balls permanently remaining in the chamber 69 and the passage 70 moves the slide 66 back into the closing position illustrated in Fig. 7.

In order to reduce wear of the balls ejected from the several passages their diameter should be small and the passages should be so arranged as to be directed oppositely to the direction of rotation (see Figs. 1, 3 and 7), thus reducing the resultant outlet velocity.

Figure 5:
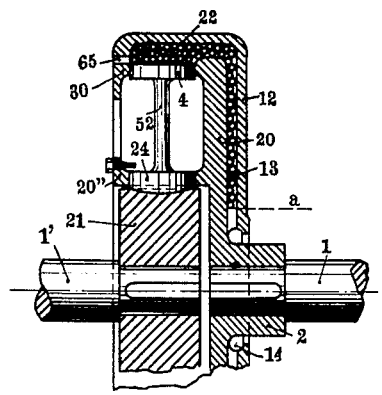
Fig. 5 is a partial axial section of a modification of the mechanism shown in Figs. 3 and 4.

Fig. 5 shows a clutch similar to that illustrated in Figs. 3 and 4, in which there is provided an inner wall 30 for the chamber 22 of the member 20. Disposed in an opening in the wall 30 is one of the pistons 4 similarly to Fig. 4 and adapted to be radially displaced. A rod 52 is provided connecting the piston 4 with a friction block 24 which is guided in openings in a concentric flange 20. The blocks face the rim of a disc 21 keyed to a shaft 1'. With this arrangement of the pistons considerable pressure may be exerted on the disc 21 on account of the great distance of the chamber 22 from the shaft, and of the smaller radius on which the blocks 24 are arranged. This type may be used as a clutch, or for other purposes. Other auxiliary parts of the mechanism are preferably designed similarly to those shown in Figs. 3 and 4.

A permanently open passage (65, Fig. 5; 67, Fig. 6; and 79, Fig. 7) can be provided, when it is desired to exert only temporarily the above-mentioned centrifugal action in order to effect certain control or braking actions, since the balls are discharged comparatively slowly through the small perforation and may be permanently made up. In other cases, other means, such as one of the valves above-described, may be provided.

Preferably roller bearings are provided for reducing the friction of parts under high pressures, as indicated for the slide 58 at 64 in Fig. 6.

The discharged balls are received by a chute 27 attached to the casing 32, and returned by their momentum to the hopper 18 through branches 31, 28 (Figs. 3 and 4). The discharge of the balls may be effected at a high rate by the provision of a number of valves 29 on the circumference of the member 20.

In order to prevent the formation of regular nests where the balls may stick or be otherwise trapped, these balls should be made of unequal size and it is also preferred to curve, break or incline the walls of the chambers and channels, as illustrated in most of the figures.

To reduce wear, the walls of the chambers should be made of softer material than the balls. The balls should have a coating of oil or grease and all chambers and channels containing balls should be permanently washed with lubricant in order to prevent dry friction.

In this construction no positive connection exists between stationary and rotating parts. The balls are supplied to the driving member, where the plastic mass works in the radial channels similarly to a column of liquid acted upon by centrifugal force, but owing to the higher specific weight of the mass, the dimensions of the appliance can be comparatively smaller for a given effect.

The invention is not limited to the several embodiments, illustrated for the purpose of examples, but what I claim is:

1. A device of the class described including a driving rotary member, a driven rotary member, a slidable member mounted between said driving and driven member, a charge of small movable bodies disposed between said driving member and said slidable member, means for introducing said charge into the field of action of said driving member, and means for selectively controlling the amount of charge introduced into the field of action of said driving member.

2. A device of the class described including a driving rotary member, a driven rotary member; a slidable member disposed between said driving member and said driven member, a charge of small movable bodies disposed between said driving member and said slidable member, and means for discharging said movable bodies from the field of action of said driving member.

3. A device of the class described, including a rotating member, a member mounted for rotational movement with said rotating member, and slidable with respect thereto, a conduit having an inlet near the axis of rotation of said rotating member, and leading to said slidable member, a reservoir disposed above said inlet, a charge of small rigid bodies in said reservoir, and means for delivering said bodies to the inlet of said conduit, whereby said bodies will be moved, under the action of centrifugal force, through said conduit into direct cooperative relationship with said slidable member, whereby said slidable member will be shifted in response to the centrifugal force exerted thereon by said bodies.

4. A device of the class described, including a rotating member, a member mounted for rotational movement with said rotating member, and slidable with respect thereto, a charge of small movable bodies disposed in cooperative relationship with said slidable member, whereby, under the action of centrifugal force, said movable bodies will shift said slidable member, and controllable means for permitting the discharge of said movable bodies from cooperative relationship with said slidable member.

5. A device of the class described, including a rotating member, a member mounted for rotational movement with said rotating member, and slidable with respect thereto, a charge of small rigid bodies, means for introducing said charge into cooperative relationship with said slidable member to move said slidable member under the action of centrifugal force, means for selectively controlling the amount of charge introduced and means for controlling the discharge of said bodies from cooperative relationship with said slidable member.

6. A device of the class described, including a rotating member, a member mounted for rotational movement with said rotating member, and slidable with respect thereto, said device being provided with a passageway leading from an inlet point near the axis of rotation of said rotating member to said slidable member, a charge of small rigid bodies, means for introducing said bodies into said passageway through the inlet end thereof, whereby said movable bodies will be moved, under the action of centrifugal force, through said passageway into direct cooperative relationship with said slidable member, whereby said slidable member will be shifted in response to the centrifugal force exerted thereon by said movable bodies, and means for controlling the discharge of said rigid bodies from said passageway.

7. A device of the class described, including a driving rotary member, a driven rotary member, a slidable member disposed between said driving and said driven members, a charge of small rigid bodies disposed between said driving member and said slidable member, and means for discharging said movable bodies from cooperative relationship with said driving member from a point near the periphery of said driving member.

8. A device of the class described, including a rotating member, a member mounted for rotational movement with said rotating member, and slidable with respect thereto, a passageway leading from an inlet point near the axis of rotation of said rotating member to said slidable member, a reservoir for holding a charge of small rigid bodies, and disposed above said inlet point, a conduit leading from said reservoir to the inlet of said passageway, valve means for controlling the flow of said bodies from said reservoir to said passageway, said passageway being provided with a discharge opening near the outer periphery thereof, a conduit leading from said discharge opening to said reservoir, and valve means for controlling the flow of small movable bodies through said discharge opening.

9. A device of the class described, including a rotating member, a member mounted for rotational movement with said rotating member, and slidable with respect thereto, a charge of small movable bodies in cooperative relationship with said slidable member, whereby said slidable member is urged into movement under the action of centrifugal force exerted by said movable bodies, and valve means actuated in response to centrifugal force for controlling the discharge of said movable bodies from cooperative relationship with said slidable member.

10. A device of the class described, including a rotating member, a member mounted for rotational movement with said rotating member, and slidable with respect thereto, said device being provided with a passageway leading to said slidable member, a charge of small movable bodies in cooperative relationship with said slidable member, said passageway being provided with a discharge outlet near the outer periphery thereof, and valve means actuated in response to centrifugal force, and including a plunger slidably mounted across said discharge outlet, for controlling the outflow of charge from said passageway.

11. A device of the class described, including a rotating member, a member mounted for rotational movement with said rotating member, and slidable with respect thereto, a charge of small rigid bodies engaging one side of said slidable member to urge said member into movement in response to centrifugal force, and valve means actuated in response to centrifugal force of an independent mass of small rigid bodies, for controlling the discharge of said charge which is disposed in cooperative relationship with said slidable member.

12. A device of the class described, including a rotating member, a slidable member mounted for rotational movement with said rotating member, said device being provided with a passageway leading to said slidable member, a charge of small rigid bodies in said passageway, and disposed in cooperative relationship with one side of said slidable member, whereby said slidable member is urged into movement with respect to said rotatable member in response to the centrifugal force exerted by said rigid bodies against said slidable member, said passageway being provided with a discharge outlet near the outer periphery thereof, a valve including a plunger for controlling the discharge of said bodies from said passageway, means for introducing an independent mass of small rigid bodies at one end of said plunger while said members are rotating, whereby under the action of centrifugal force exerted by said last mentioned mass, the plunger will move to uncover said discharge outlet, whereby the evacuation of said passageway is effected.

13. A device of the class described, including a driving rotary member, a driven rotary member, a slidable member mounted between said driving and driven members, said device being provided with a passageway leading from an inlet point near the axis of rotation of said driving member, and leading to one side of said slidable member, a charge of small movable bodies, and means for introducing said charge into the inlet of said passageway, whereby said charge, under the action of centrifugal force, will move into cooperative relationship with said slidable member to move said slidable member into engaging relationship with said driven member.

14. A device of the class described, including a driving rotary member, a slidable member carried by said driving member, and movable in a radial direction, said slidable member having a radially inwardly facing surface, a driven rotary member mounted coaxially with respect to said driving member, and having a radially outwardly facing surface, and a charge of small movable bodies disposed between said driving member and said slidable member, for forcing said slidable member into operative relationship with said driven member.

15. A device of the class described, including a driving rotary member, having an annular channel near the outer periphery thereof, a radially slidable member having its outer end exposed to said channel, and having a frictional surface at its inner end, a driven rotary member coaxially mounted with respect to said driving member, and having a frictional surface adjacent the inner end of said slidable member, and a charge of small movable bodies disposed in said channel, for forcing said slidable member into frictional engaging relationship with said driven member.

16. A device of the class described, including a driving rotary member, a slidable member carried by said rotary member, and movable in a radial direction, said slidable member having a frictional engaging surface facing the axis of rotation, a driven rotary member mounted coaxially with respect to said driving member, and having a frictional engaging surface facing the frictional engaging surface of said slidable member, a conduit leading into the space between said driving member and said slidable member, and having an inlet disposed near the axis of rotation of said driving member, and means for introducing a charge of small movable bodies into said conduit through the inlet point thereof, said conduit being rotatable with said driving member, whereby under the action of centrifugal force, said mass of small movable bodies will be moved into cooperative relationship with said slidable member to move it into frictional engaging relationship with said driven member.

In testimony whereof, I have signed my name to this specification.

Dr. HERMANN FÖTTINGER.